US012770038B2

(12) United States Patent

Hoang et al.

(10) Patent No.: US 12,770,038 B2
(45) Date of Patent: Oct. 20, 2026

(54) INTERPRETABILITY OF DECISION MAKING METHODS

(71) Applicant: INTERNATIONAL BUSINESS MACHINES CORPORATION, Armonk, NY (US)

(72) Inventors: Lan Ngoc Hoang, Timperley (GB); Alexander Zadorojniy, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 891 days.

(21) Appl. No.: 18/145,846

(22) Filed: Dec. 22, 2022

(65) Prior Publication Data

US 2024/0211766 A1 Jun. 27, 2024

(51) Int. Cl.
*G06N 5/045* (2023.01)
*G06N 3/092* (2023.01)

(52) U.S. Cl.
CPC ............. *G06N 5/045* (2013.01); *G06N 3/092* (2023.01)

(58) Field of Classification Search
None
See application file for complete search history.

(56) References Cited

U.S. PATENT DOCUMENTS 11,087,505 B2 * 8/2021 Phogat ................. G06V 10/763
11,443,212 B2 * 9/2022 Kishimoto ............. G06N 5/013
11,597,394 B2 * 3/2023 Yeh ........................ G06N 5/045
11,645,617 B1 * 5/2023 McDonald ............... G06N 7/01
705/28
12,033,088 B1 * 7/2024 Verma .................... G06N 5/045
12,260,328 B2 * 3/2025 Kimura .................. G06N 3/092
2020/0250557 A1 * 8/2020 Kishimoto ............. G06N 5/045
2020/0293755 A1 9/2020 Cyrus (Continued)

FOREIGN PATENT DOCUMENTS

CN 112884148 A 6/2021
CN 113625569 B 2/2022

OTHER PUBLICATIONS

Chaudhury, Subhajit et al. Bootstrapped Q-learning with Context Relevant Observation Pruning to Generalize in Text-based Games, Sep. 24, 2010. <https://doi.org/10.48550/arXiv.2009.11896> (Year: 2020).*

(Continued)

*Primary Examiner* — Tamara T Kyle
*Assistant Examiner* — Tyler Schallhorn
(74) *Attorney, Agent, or Firm* — CHIP LAW GROUP

(57) ABSTRACT

A method and system of increasing interpretability of decision making methods include a network module providing raw data from an environment to a machine learning (ML) module. In response to the raw data being delivered to the ML module, the ML module generates a trained classifier using the raw data. A pruning module then prunes a plurality of dominant variables, in the sense of being most relevant for the decision made with respect to the classifier, using the trained classifier. The network module then provides the sub-optimal policy to a reinforcement learning (RL) module, where a generated sub-optimal policy is applied to the environment to obtain a dataset by applying the sub-optimal policy and generating a trajectory. The ML module then generates an interpretable set of rules using the generated trajectory.

21 Claims, 16 Drawing Sheets

(56) References Cited

U.S. PATENT DOCUMENTS

| | | | | |
|---|---|---|---|---|
| 2021/0150775 | A1* | 5/2021 | Phogat | G06V 10/56 |
| 2022/0138568 | A1* | 5/2022 | Smolyanskiy | G06N 3/0442 706/21 |
| 2022/0180230 | A1 | 6/2022 | Duesterwald et al. | |
| 2022/0309436 | A1* | 9/2022 | Evans | G06Q 10/06375 |
| 2023/0108135 | A1* | 4/2023 | Kimura | G06F 40/205 706/25 |

OTHER PUBLICATIONS

Kimura, Daiki et al. Neuro-Symbolic Reinforcement Learning with First-Order Logic, Oct. 21, 2021. <https://doi.org/10.48550/arXiv.2110.10963> (Year: 2021).*

Fischer, M. et al., DL2: Training and Querying Neural Networks with Logic, Proceedings of the 36th International Conference on Machine Learning, Long Beach, California, (PMLR 97, 2019), 11 pgs.

Gottesman, O. et al., "Interpretable Off-Policy Evaluation in Reinforcement Learning by Highlighting Influential Transitions", Proceedings of the 37th International Conference on Machine Learning, Vienna, Austria, (PMLR'119-2020), 19 pgs.

Anonymous Authors, "Interpretable Reinforcement Learning with Neural Symbolic Logic", ICLR (2021), 11 pgs.

Lyu, D. et al., "SDRL: Interpretable and Data-efficient Deep Reinforcement Learning Leveraging Symbolic Planning", Association for the Advancement of Artificial Intelligence (2019), 9 pgs.

Chimatapu, R. et al., "Hybrid Deep Learning Type-2 Fuzzy Logic Systems For Explainable AI", www.semanticscholar.org (2020), 6 pgs.

hubbs5/or-gym, Retrieved from: https://web.archive.org/web/20200820184843/https://github.com/hubbs5/or-gym, Aug. 20, 2020, 4 pages.

* cited by examiner

800

850

```
|--- state_12 <= 10.00
|   |--- state_23 <= 3.50
|   |   |--- state_26 <= 3.50
|   |   |   |--- state_29 <= 3.50
|   |   |   |   |--- state_32 <= 4.00
|   |   |   |   |   |--- state_16 <= 13.00
|   |   |   |   |   |   |--- state_30 <= 12.00
|   |   |   |   |   |   |   |--- class: 0
|   |   |   |   |   |   |--- state_30 >  12.00
|   |   |   |   |   |   |   |--- state_31 <= 15.00
|   |   |   |   |   |   |   |   |--- class: 0
|   |   |   |   |   |   |   |--- state_31 >  15.00
|   |   |   |   |   |   |   |   |--- class: 0
|   |   |   |   |   |--- state_16 >  13.00
|   |   |   |   |   |   |--- state_18 <= 11.00
|   |   |   |   |   |   |   |--- state_22 <= 27.00
|   |   |   |   |   |   |   |   |--- state_24 <= 14.50
|   |   |   |   |   |   |   |   |   |--- class: 2
|   |   |   |   |   |   |   |   |--- state_24 >  14.50
```

FIG. 8B

950

```
|--- state_30 <= 19.50
|   |--- state_31 <= 19.00
|   |   |--- state_28 <= 13.50
|   |   |   |--- class: 0
|   |   |--- state_28 >  13.50
|   |   |   |--- class: 0
|   |--- state_31 >  19.00
|   |   |--- state_28 <= 30.50
|   |   |   |--- state_2 <= 41.50
|   |   |   |   |--- class: 0
|   |   |   |--- state_2 >  41.50
|   |   |   |   |--- class: 0
|   |   |--- state_28 >  30.50
|   |   |   |--- class: 0
|--- state_30 >  19.50
|   |--- state_31 <= 19.00
|   |   |--- state_28 <= 30.50
|   |   |   |--- class: 0
|   |   |--- state_28 >  30.50
|   |   |   |--- class: 0
|   |--- state_31 >  19.00
|   |   |--- state_28 <= 30.50
|   |   |   |--- class: 0
|   |   |--- state_28 >  30.50
|   |   |   |--- state_2 <= 22.00
|   |   |   |   |--- class: 0
|   |   |   |--- state_2 >  22.00
|   |   |   |   |--- class: 0
```

FIG. 9B

1075

```
topk = [list_node_W[i] for i in ind]
```

```
topk
```

```
['state_16 ', 'state_30 ', 'state_21 ', 'state_24 ']
```

FIG. 10C

1100

| | |
|---|---|
| PPO | 449 |
| MDP - LNN | 444 |
| MDP - DT | 411 |
| MDP - GNN | 379 |

FIG. 11A

1150

| | Obj | SateVars | Action_0 | Action_1 | Action_2 |
|---|---|---|---|---|---|
| PPO | 449 | 33 | [0,100] | [0,90] | [0,80] |
| MDP | 444 | 3 | [10,45] | [5,65] | [0,25] |

FIG. 11B

1200

| | Train Accuracy | Test Accuracy | State_Columns | Reward | Training time |
|---|---|---|---|---|---|
| DT | 88.16% | 86.09% | 'state_2', 'state_28', 'state_30', 'state_31' | 411.378445546843 | 69.46141910552979 |
| GNN | 73.33% | 68.00% | 'state_16', 'state_30', 'state_21', 'state_24' | 361 | Multiple hours |

FIG. 12

INTERPRETABILITY OF DECISION MAKING METHODS

BACKGROUND

Technical Field

The present disclosure generally relates to methods and systems for interpreting decision making methods, and more particularly, to methods and systems of hybrid interpretability of decision making methods using machine learning and reinforcement learning.

Description of the Related Art

Machine learning is a field that utilizes datasets to create decisions that can improve the performance of tasksets relevant to processes, products, and research. Interpretability of the decisions is salient for gaining customers trust and increasing usage of the decision makers such as MDP (Markov decision process) and RL (reinforcement learning).

Post-hoc methods such as LIME (local interpretable model-agnostic explanations), SHAP (Shapley additive explanations), and query-based explanations are frequently done to provide some relation between input features and model outputs for a reduced number of variables. There is no guarantee that the rules remain operational in the source environment. Intrinsic methods like decision trees, custom models, and newly developed languages have a high complexity. Specifically, decision trees may be deep and may embody low interpretability over time. Hybrid methods such as attention-based saliency maps may include altering a model to produce an explanation along with recommendations. As time passes, the quality of the recommendations is expected to degrade.

SUMMARY

According to an embodiment of the present disclosure, a method for increasing interpretability of decision making methods using a machine learning (ML) module, a reinforcement learning (RL) module, a pruning module, a network module, and an environment are utilized to carry out the method. The method includes providing, by a network module, raw data from the environment to the ML module. Once the raw data is delivered to the ML module, the ML module generates a trained classifier using the raw data. The pruning module then prunes a plurality of dominant variables using the trained classifier. The network module then provides the raw data and the plurality of dominant variables to the RL module, wherein each of the plurality of dominant variables are deemed a salient variable for each decision made with respect to the trained classifier; a generated sub-optimal policy is applied to the environment to obtain a dataset by applying the sub-optimal policy and generating a trajectory. The ML module then generates an interpretable set of rules using the generated trajectory. The method is advantageous in that there is no significant degradation in quality of the output of operational rules.

In one embodiment, which can be combined with the previous embodiment, the environment is a supply chain environment.

In another embodiment, which can be combined with the previous embodiments, the ML module comprises computer readable code configured to provide an agent instructions to run a reinforcement learning algorithm. More specifically, the reinforcement learning algorithm is a proximal policy optimization and in other embodiments, can be any methodology involving taking state variables to produce an action recommendation. The PPO is advantageous in that it provides a neuro-symbolic output that, when run with an RL model, provides operational rules that include a greater interpretability to be understood by a human/individual.

In another embodiment, which can be combined with the previous embodiments, the ML module is a deep learning (DL) module.

In another embodiment, which can be combined with the previous embodiments, the RL module is a Markov Decision Process (MDP) module.

According to an embodiment of the present disclosure, a computer program product for increasing interpretability of decision making methods is provided. The computer program product includes a computer readable storage medium embodying program instructions executable by a processor to cause the processor to perform a plurality of steps. A network module provides raw data from an environment to an ML module. Once the raw data is delivered to the ML module, the ML module generates a trained classifier using the raw data. A pruning module then prunes a plurality of dominant variables using the trained classifier. The network module then provides the raw data and the plurality of dominant variables to an RL module, wherein each of the plurality of dominant variables are deemed a salient variable for each decision made with respect to the trained classifier; a generated sub-optimal policy is applied to the environment to obtain a dataset by applying the sub-optimal policy and generating a trajectory. The ML module then generates an interpretable set of rules using the generated trajectory. The computer program product is advantageous in that there is no significant degradation in quality of the output of operational rules.

In one embodiment, which can be combined with the previous embodiment, the environment is a supply chain environment.

In another embodiment, which can be combined with the previous embodiments, the instructions further cause the processor to authorize an agent to run a reinforcement learning algorithm. More specifically, the reinforcement learning algorithm is a proximal policy optimization and in other embodiments, can be any methodology involving taking state variables to produce an action recommendation. The PPO is advantageous in that it provides a neuro-symbolic output that, when run with an RL model, provides operational rules that include a greater interpretability to be understood by a human/individual.

In another embodiment, which can be combined with the previous embodiments, the ML module is a deep learning (DL) module.

In another embodiment, which can be combined with the previous embodiments, the RL module is a Markov Decision Process (MDP) module.

According to an embodiment of the present disclosure, a computing device is provided. There is a processor, a network module coupled to the processor to enable communication over a network, a non-transitory computer-readable storage device coupled to the processor, a machine learning (ML) module coupled to the network module, a reinforcement learning (RL) module coupled to the network module, and a pruning module coupled to the network module. Program instructions are stored on the non-transitory computer-readable storage device for execution by the processor via the memory. Computing device, in conjunction with the program instructions, is capable of performing a method for increasing interpretability of decision making methods. The network module provides raw data from the environment to the ML module. Once the raw data is delivered to the ML module, the ML module generates a trained classifier using the raw data. The pruning module then prunes a plurality of dominant variables using the trained classifier. The network module then provides the raw data and the plurality of dominant variables to the RL module, wherein each of the plurality of dominant variables are deemed a salient variable for each decision made with respect to the trained classifier; a generated sub-optimal policy is applied to the environment to obtain a dataset by applying the sub-optimal policy and generating a trajectory. The ML module then prunes an interpretable set of rules using the generated trajectory. The computing device is advantageous in that there is no significant degradation in quality of the output of operational rules.

In one embodiment, which can be combined with the previous embodiment, the environment is a supply chain environment.

In another embodiment, which can be combined with the previous embodiments, the ML module comprises computer readable code configured to provide an agent instructions to run a reinforcement learning algorithm. More specifically, the reinforcement learning algorithm is a proximal policy optimization and in other embodiments, can be any methodology involving taking state variables to produce an action recommendation. The PPO is advantageous in that it provides a neuro-symbolic output that, when run with an RL model, provides operational rules that include a greater interpretability to be understood by a human/individual.

In another embodiment, which can be combined with the previous embodiments, the ML module is a deep learning (DL) module.

In another embodiment, which can be combined with the previous embodiments, the RL module is a Markov Decision Process (MDP) module.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 8B presents a portion of a set of rules accompanying the initial decision tree algorithm, consistent with an illustrative embodiment.

FIG. 9B presents a set of rules accompanying the finalized decision tree algorithm, consistent with an illustrative embodiment.

FIG. 10C presents computer readable code configured to call states with the highest rewards, consistent with an illustrative embodiment.

FIG. 11A presents a chart comparing algorithms to the number of rewards, consistent with an illustrative embodiment.

FIG. 11B presents a chart comparing variables of a Proximal Policy Optimization (PPO) algorithm and an Markov Decision Process (MDP) algorithm, consistent with an illustrative embodiment.

FIG. 12 presents a chart comparing a plurality of features of a decision tree algorithm and a graphical neural network algorithm applied to a Markov Decision Process, consistent with an illustrative embodiment.

DETAILED DESCRIPTION

Overview

Figure 1:
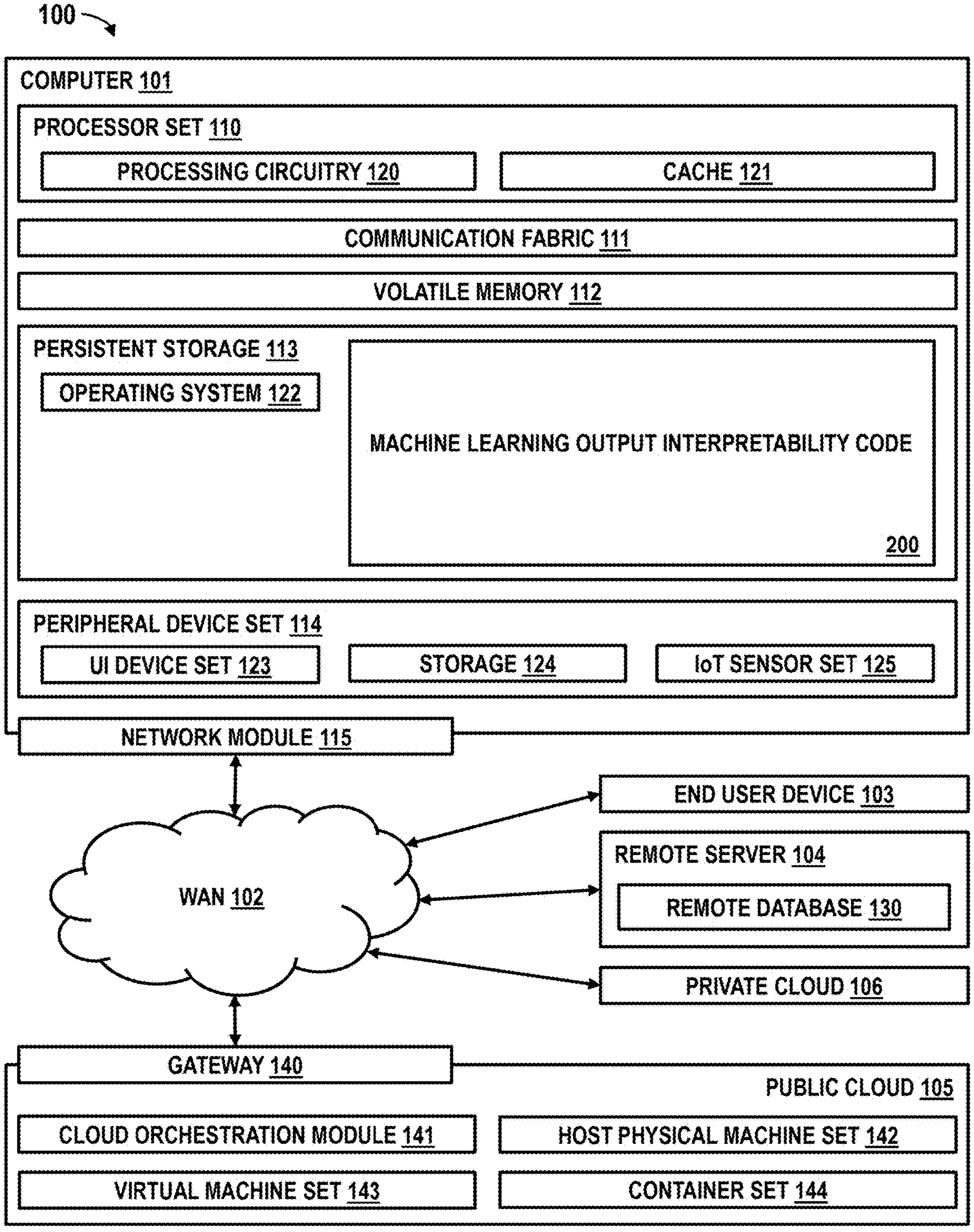
FIG. 1 is a functional block diagram illustration of a computing environment that can communicate with various networked components.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a functional block diagram illustration of a computing environment 100 that can communicate with various networked components, such as the cloud, a policy data source, etc. In particular, FIG. 1 illustrates a computing environment 100, as may be used to implement a module, such as, for example, a deep learning (DL) module 220, a Markov Decision Process (MDP) module 230, and a pruning module 240.

Computing environment 100 includes an example of an environment for the execution of at least some of the computer code involved in performing the inventive methods, such as machine learning output interpretability code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The present disclosure generally relates to methods for interpreting decisions of machine learning models. By virtue of the concepts discussed herein, sequential decision making is combined with a neuro-symbolic approach to construct a pipeline to achieve greater interpretability for both machine and human/individual.

Importantly, although the operational/functional descriptions described herein may be understandable by the human mind, they are not abstract ideas of the operations/functions divorced from computational implementation of those operations/functions. Rather, the operations/functions represent a specification for an appropriately configured computing device. As discussed in detail below, the operational/functional language is to be read in its proper technological context, i.e., as concrete specifications for physical implementations.

Accordingly, one or more of the methodologies discussed herein may obviate a need for time consuming data processing by the user. This may have the technical effect of reducing computing resources used by one or more devices within the system. Examples of such computing resources include, without limitation, processor cycles, network traffic, memory usage, storage space, and power consumption.

It should be appreciated that aspects of the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing the process discussed herein can be more complex than information that could be reasonably be processed manually by a human user.

EXAMPLE ARCHITECTURE

Figure 2:
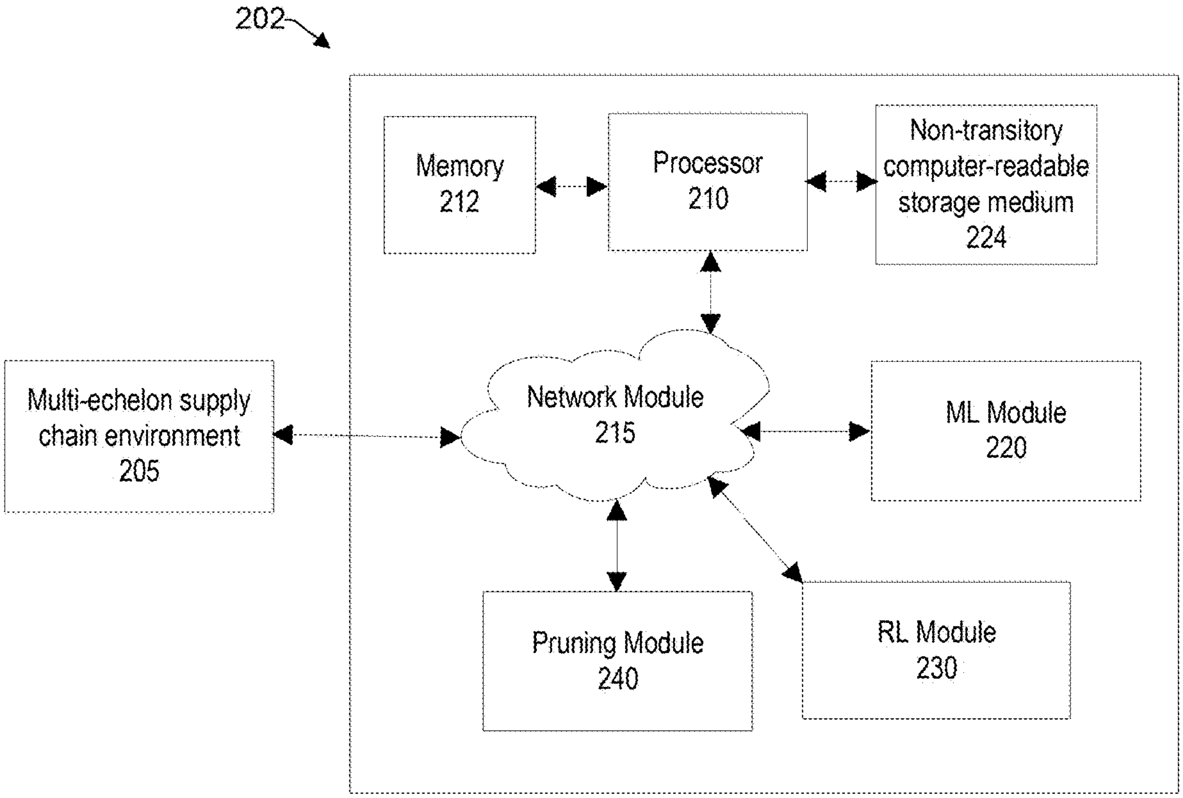
FIG. 2 presents a computing device for increasing interpretability of decision making methods, consistent with an illustrative embodiment.

Reference is now made to FIG. 2, which presents a computing device 202 for increasing interpretability of decision making methods, consistent with an illustrative embodiment. As shown, network module 215 (similar to the network module 115 of FIG. 1) provides coupling between an environment 205, specifically a supply chain environment 205 (and as shown, a multi-echelon supply chain environment), and a plurality of modules 220, 230, 240 configured to increase interpretability of machine learning models. Environment 205 provides data in the form of states that assists a machine learning (ML) module 220 in forming a dataset based on environment 205. Network module 215 is coupled to a processor 210 to enable the processor communication over a network established by network module 215. Additionally, a non-transitory computer-readable storage device 224 is coupled to the processor.

Program instructions (additionally referred to as machine learning output interpretability code 200) stored on the non-transitory computer-readable storage device are configured for execution by the processor via a memory 212 (similar to the volatile memory 112 of FIG. 1) coupled to processor 210. The instructions are configured to render computing device 200 capable of performing a number of operations in a method for increasing interpretability of decision making methods (presented similarly in FIG. 7). The method includes providing, by the network module 215, raw data from the supply chain environment 205 to the ML module 220. Once the raw data is delivered to the ML module 220, the ML module generates a trained classifier (similar to trained classifier 435 in FIG. 4) using the raw data. The pruning module 240 then prunes a plurality of dominant variables using the trained classifier. The network module 215 then provides the raw data and the plurality of dominant variables to the RL module 230, where each of the plurality of dominant variables are deemed a salient variable for each decision made with respect to the trained classifier 435; a generated sub-optimal policy is applied to the environment 205 to obtain a dataset (similar to dataset 525) by applying the sub-optimal policy and generating a trajectory. The ML module 240 then generates an interpretable set of rules using the generated trajectory. Computing device 202 is advantageous in that there is no significant degradation in quality of the output of operational rules.

In an embodiment, the trained classifier 435 includes a plurality of actions, a plurality of states, and a plurality of rewards.

The RL module 230 may comprise computer readable code configured to provide an MDP solver 525 instructions to run at least one of a decision tree algorithm, a logical neural network algorithm, and a graph neural network algorithm. The RL module 230 may be configured to be trained with an algorithm in under two minutes.

In a further embodiment, the machine learning (ML) module may be one of a deep learning (DL) module, a random forest, and a decision tree. It is further noted that the machine learning (ML) module may include any machine learning model that can provide classification or regression of input features to predict the recommended actions or the class of the actions.

In a further embodiment, the reinforcement learning (RL) module may be one of a Markov Decision Process (MDP) module, a DQN, MCQ, a DDPG, and TD. It is further noted that reinforcement learning (RL) module may include at least one of on-line RL and offline RL.

Figure 3:
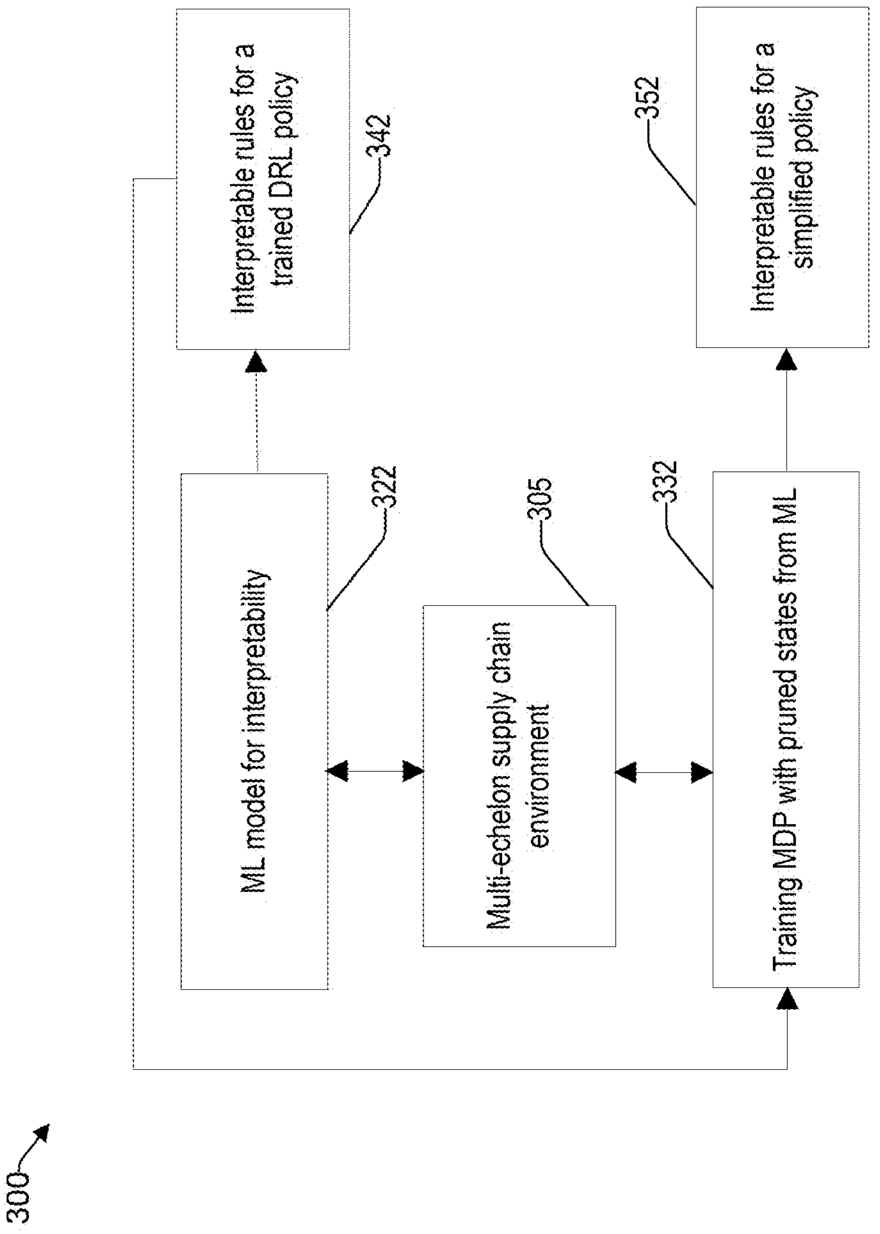
FIG. 3 presents an interpretability flow process for effective environmental analytics using machine learning (ML) and Markov Decision Process (MDP) models, consistent with an illustrative embodiment.

Reference is now made to FIG. 3, which is an interpretability flow process 300 for effective environmental analytics using machine learning (ML) and Markov Decision Process (MDP) models, consistent with an illustrative embodiment. A supply chain environment 305 (similar to supply chain environment 205 of FIG. 2) provides states to an ML module (such as ML module 220 of FIG. 2, for example) in order to create an ML model 322. The ML model 322 includes interpretable rules 342 for a trained deep reinforcement learning (DRL) policy. These rules 342 are configured to be interpretable by a machine, but not necessarily by a human/individual. In order to make rules 342 interpretable by a human/individual, an MDP module (similar to RL module 230 of FIG. 2) may be trained 332 with the "pruned" rules 342 in supply chain environment 305 in order to provide interpretable rules 352 for a simplified policy. The interpretable rules 352 are configured to be interpretable by a human/individual.

Figure 4:
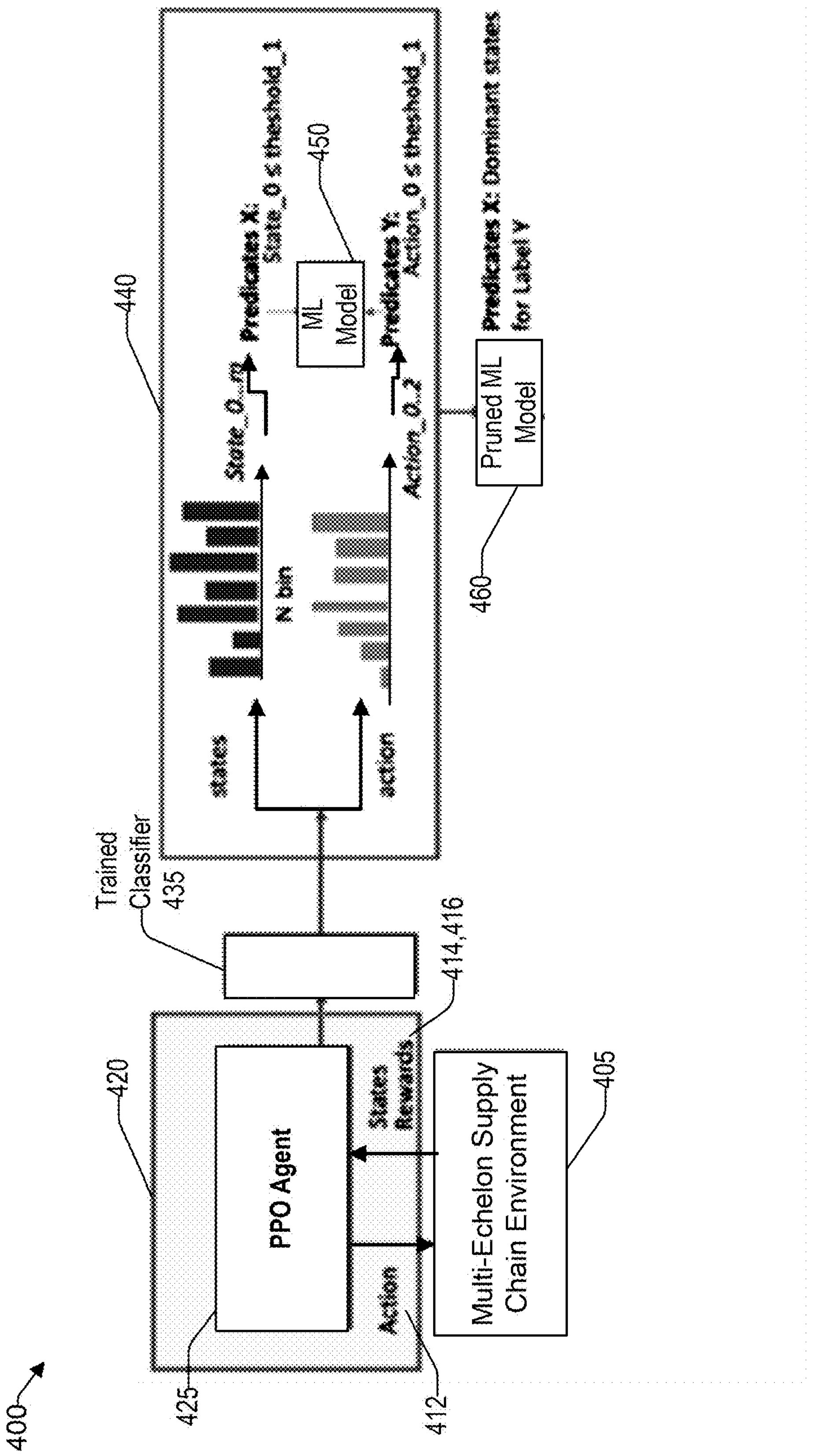
FIG. 4 presents a portion of an interpretability flow process for effective environmental analytics using machine learning (ML) and Markov Decision Process (MDP) models, consistent with an illustrative embodiment.

Reference is now made to FIG. 4, which presents a portion of an interpretability flow process 400 for effective environmental analytics using machine learning (ML) and Markov Decision Process (MDP) models, consistent with an illustrative embodiment. As shown, an ML module 420 houses a Proximal Policy Optimization (PPO) Agent 425 that performs actions 412 on an environment 405 and receives a set of states 414 and rewards 416 in response to the actions 412 (including an initial state, state 0). PPO agent 425 gathers the actions 412, states 414, and rewards 416 information to generate trained classifier 435 that is utilized by pruning module 440, where a machine learning model 450 created by the pruning module 440 is pruned and output as a pruned ML model 460. In an embodiment, the ML module 420 includes computer readable code configured to provide an agent instructions to run a reinforcement learning algorithm that is a proximal policy optimization and in other embodiments, can be any methodology involving taking state variables to produce an action recommendation. The PPO is advantageous in that it provides a neuro-symbolic output that, when run with the MDP, provides operational rules that include a greater interpretability to be understood by a human/individual.

In an embodiment, PPO agent 425 and proximal policy optimization may utilize a deep reinforcement learning (DRL) algorithm other than PPO and may include, but is not limited to a Deep Q Learning (DQN), Multiple Choice Questions (MCQ), a Deep Deterministic Policy Gradient (DDPG), and Temporal Difference (TD).

In an embodiment, ML module 420, machine learning model 450, and pruned ML model 460 may be configured as deep learning modules and models.

Figure 5:
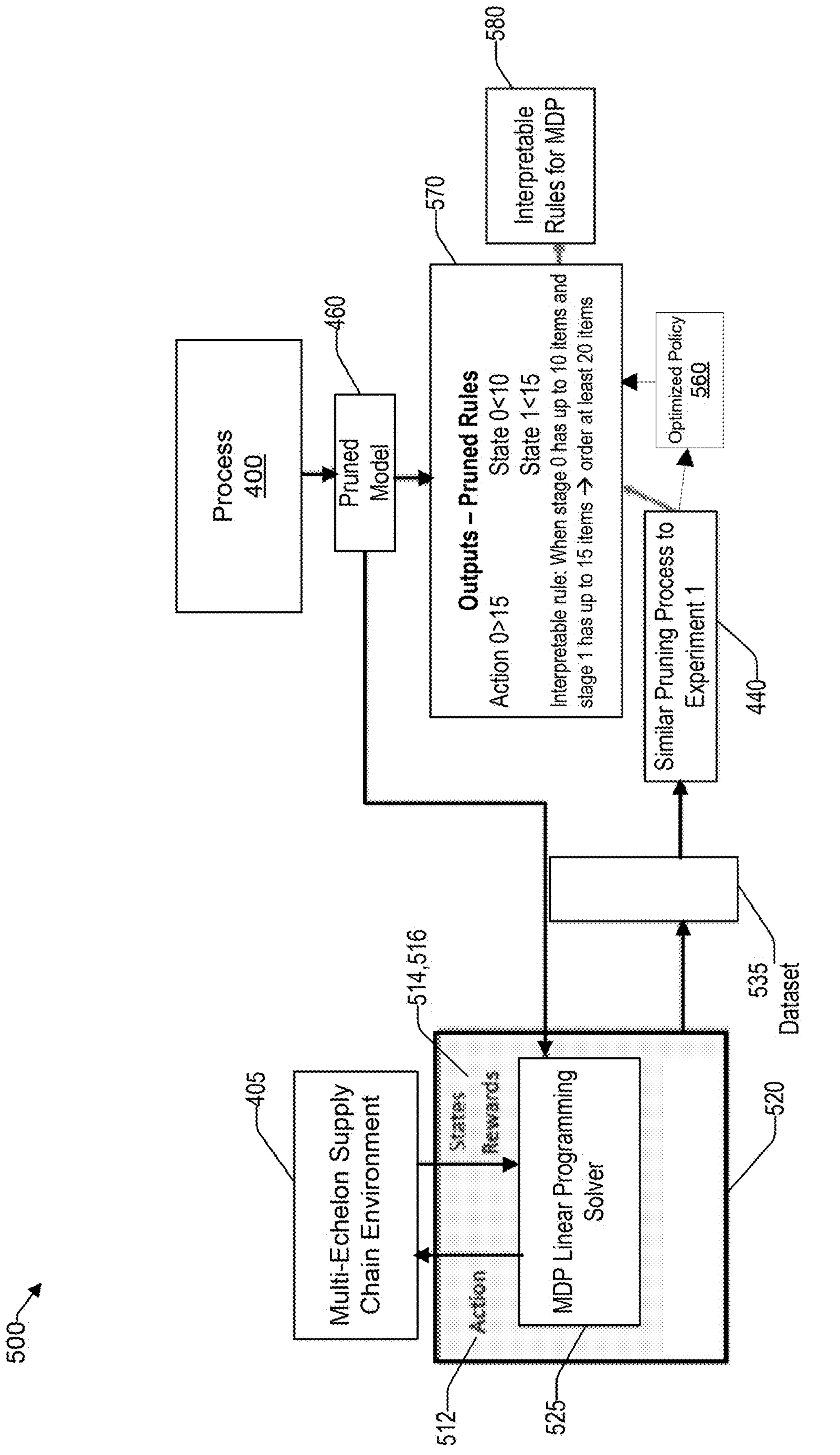
FIG. 5 presents an additional portion of an interpretability flow process for effective environmental analytics using machine learning (ML) and Markov Decision Process (MDP) models, consistent with an illustrative embodiment.

Reference is now made to FIG. 5, which presents an additional portion of an interpretability flow process 500 for effective environmental analytics using machine learning (ML) and Markov Decision Process (MDP) models, consistent with an illustrative embodiment. As shown, an MDP module 520 houses an MDP Linear Programming Solver 525 that performs actions on the environment 405 and receives a set of states 514 and rewards 516 in response to the actions 512 (including an initial state, state 0). The pruned model 460 of process 400 includes the top three state outputs (a sub-optimal policy) and is fed to MDP module 520 (similar to the RL module 230 of FIG. 2. MDP module 520 then gathers the actions 512, states 514, and rewards 516 information as a dataset 535 and sends the dataset 535 to pruning module 440, wherein an MDP model created by the pruning module 440 is pruned and output as optimized policy 560 of the MDP module 520. It is noted that optimized policy 560 includes interpretable rules 580 that can be interpreted by an individual and not just by a machine. As an example of an output of a pruned set of rules 570 found in the pruned MDP model, if Action 0 is greater than 15 and when state 0 has up to 10 items and state 1 has up to 15 items, an order of at least 20 items is presented.

For the purposes of this disclosure, the term "solver" May refer to a device configured to receive instructions to render MDP module 520 capable of applying a sub-optimal policy to supply chain environment 205 to obtain a dataset 535 having a trajectory.

In an embodiment, data associated with trained classifier 435 and dataset 535 from supply chain environment 305 may include inventory levels (states), the number of ordered items (actions), and a mixture of revenue gained from items sold and holding costs (rewards). In an embodiment, at least one of trained classifier 435 and dataset 535 include data collected for 10 consecutive days.

Figure 6:
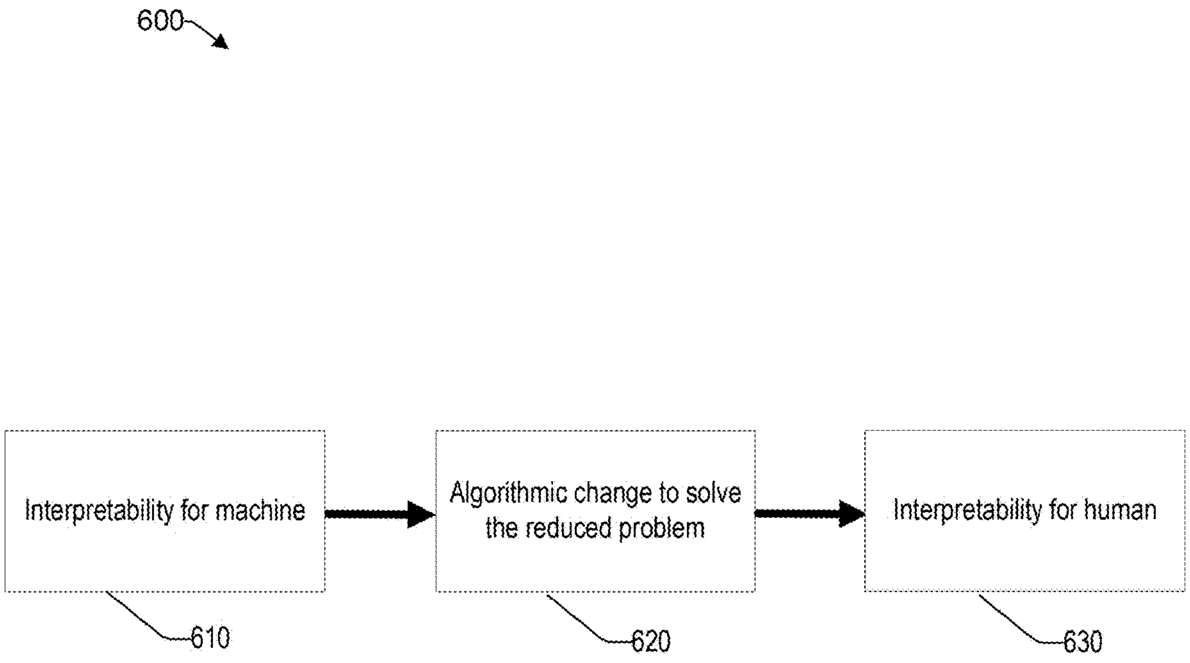
FIG. 6 is a simple flowchart for a method for increasing interpretability of decision making methods, consistent with an illustrative embodiment.

Reference is now made to FIG. 6, which is a simple flowchart 600 for a method for increasing interpretability of decision making methods, consistent with an illustrative embodiment. As shown, a step 610 includes generating a trained classifier 435 using raw data from the environment 405, where the pruned DL model 460 is only interpretable for a machine (as opposed to a human/individual). At block 620 an algorithmic change is performed to solve the reduced problem, where an MDP linear programming solver 525 is configured to adjust the data of the pruned DL model 450 and output a dataset 535. At block 630 interpretable rules 580 are output by pruning the dataset 535 to output interpretable rules 580 that are configured to be interpretable by a human/individual.

Figure 7:
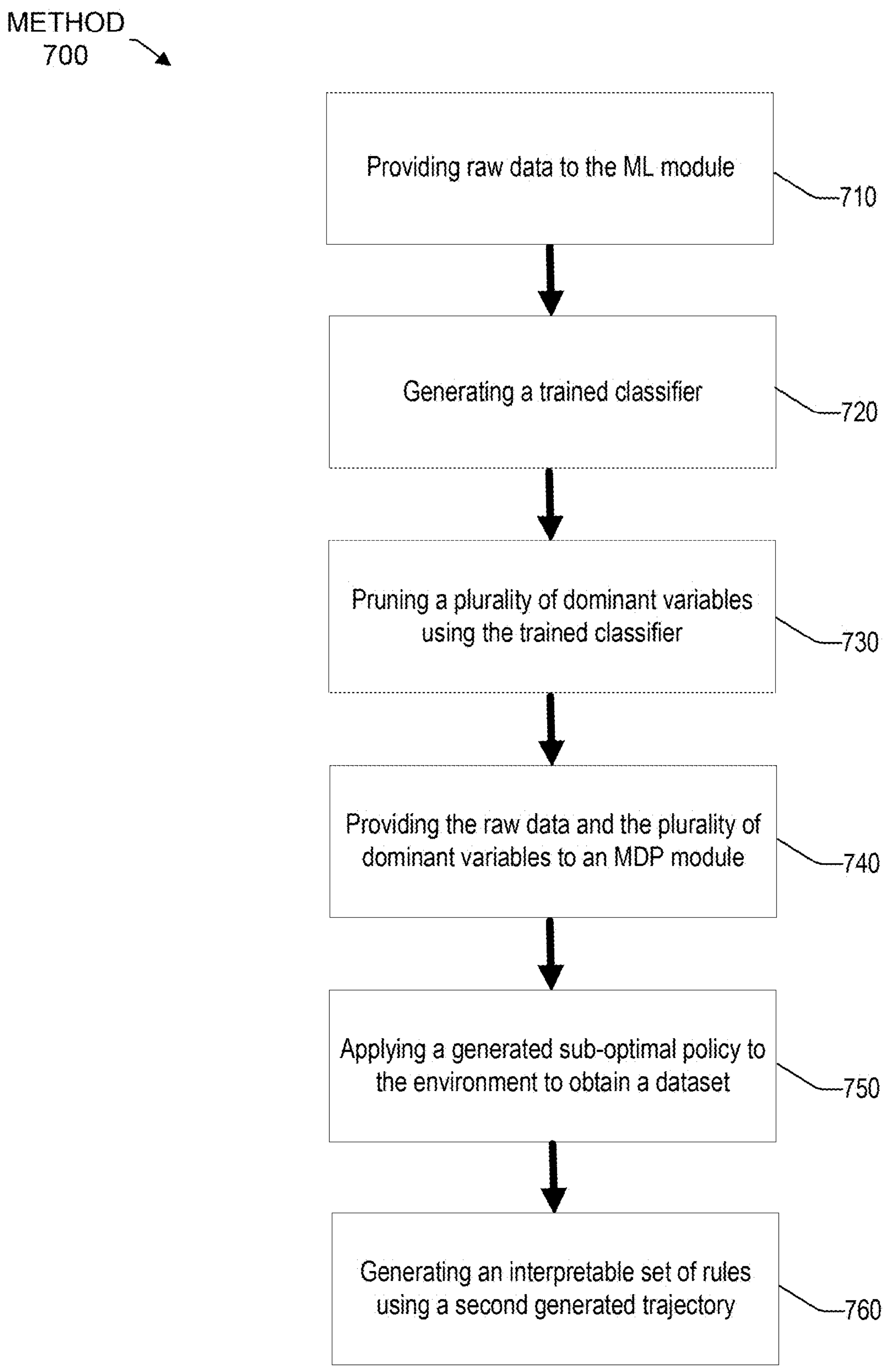
FIG. 7 is a flowchart for a hybrid method for increasing interpretability of decision making methods, consistent with an illustrative embodiment.

With the foregoing overview of the example architecture/environment/device 100,200, it may be helpful to consider a high-level discussion of an example process. To that end FIG. 7 presents a flowchart for a hybrid method 700 for increasing interpretability of decisions of machine learning modules, consistent with an illustrative embodiment.

Flowchart of method 700 is illustrated as a process in logical flowchart format, wherein the flowchart represents a sequence of operations that can be implemented in hardware, software, or a combination thereof. In the context of software, the process represents computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described processes can be combined in any order and/or performed in parallel to implement the process. For discussion purposes, the method 700 is described with reference to the architecture of environment 100 and device 202 of FIG. 1. The method is advantageous in that there is no significant degradation in quality of the output of operational rules.

At block 710, network module 215 provides raw data from environment 205 to an ML module 420. In an embodiment, the environment 405 is a supply chain environment.

At block 720, the ML module 420 generates a trained classifier 435 using the raw data. In an embodiment, the ML module 420 comprises computer readable code configured to provide an agent instructions to run a reinforcement learning algorithm. More specifically, the reinforcement learning algorithm is a proximal policy optimization and in other embodiments, can be any methodology involving taking state variables to produce an action recommendation. The PPO is advantageous in that it provides a neuro-symbolic output that, when run with the MDP, provides operational rules that include a greater interpretability to be understood by a human/individual.

At block 730, a pruning module 440 prunes a plurality of dominant variables using the trained classifier 435.

At block 740, the network module 215 provides the raw data and the plurality of dominant variables to the MDP module 520, where each of the plurality of dominant variables are deemed a salient variable for each decision made with respect to the trained classifier 435.

At block 750, a generated sub-optimal policy is applied to the environment 405 by the MDP module 520 to obtain a dataset 535 by applying the sub-optimal policy and generating a trajectory. In an embodiment, the MDP module 520 comprises computer readable code configured to provide an MDP solver 525 instructions to run at least one of a decision tree algorithm, a logical neural network algorithm, and a graph neural network algorithm.

At block 760, the ML module 420 generates an interpretable set of rules using the generated trajectory. It is noted that optimized policy 560 contains interpretable rules 580 that are configured to be interpretable by a human/individual and not just by a machine.

In an embodiment, the trained classifier 435 includes a plurality of actions, a plurality of states, and a plurality of rewards.

In a further embodiment, the machine learning (ML) module may be a machine learning (ML) module that may include, but is not limited to, random forest and decision tree. In other embodiments, the machine learning (ML) module may be a deep learning (DL) module.

In a further embodiment, the Markov Decision Process (MDP) module may be a reinforcement learning (RL) module other than a MDP module that may include, but is not limited to, DQN, MCQ, DDPG, and TD.

The RL module 520 can be configured to be trained with an algorithm in under two minutes.

Figure 8A:
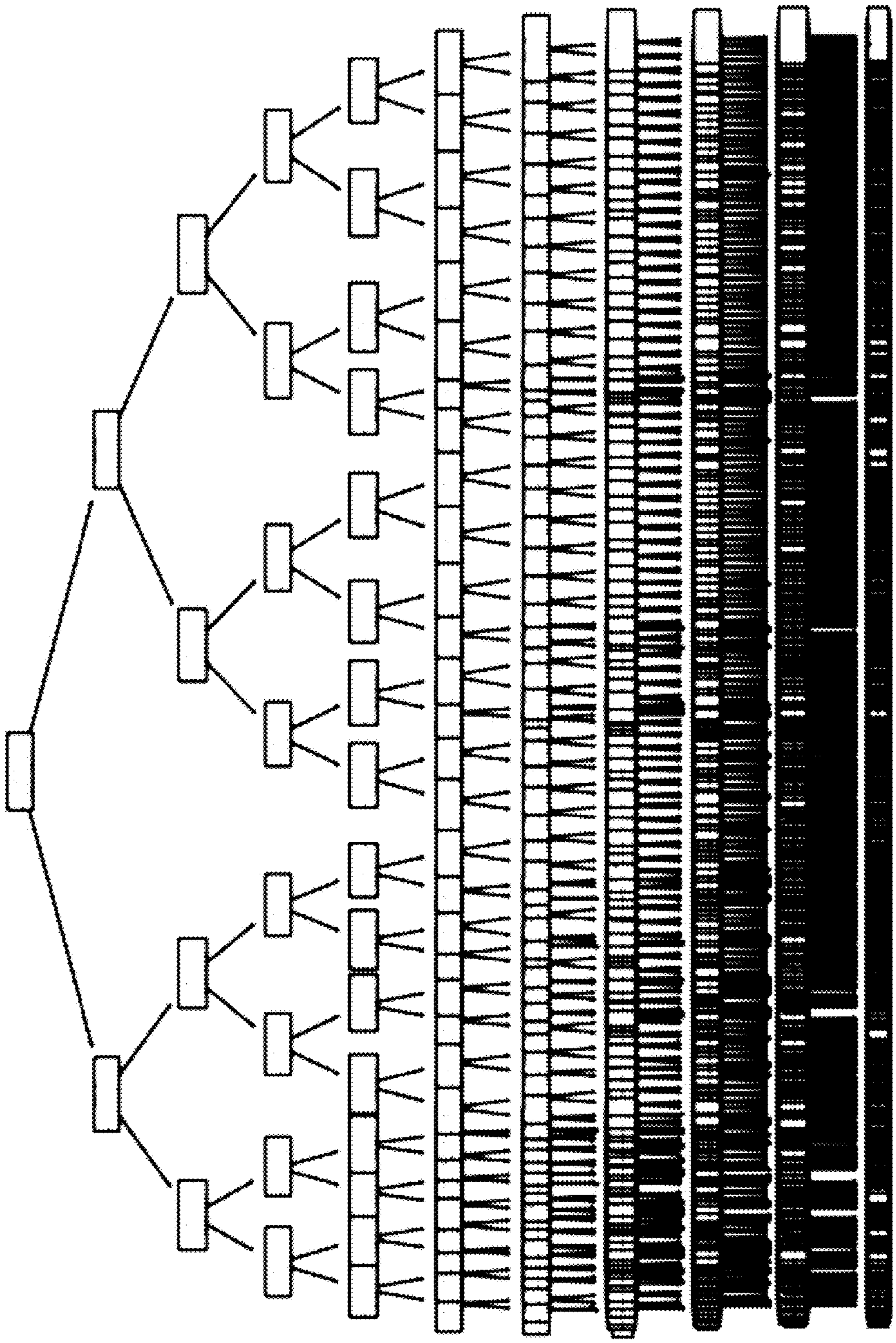
FIG. 8A illustrates an initial decision tree algorithm, consistent with an illustrative embodiment.

Reference is now made to FIG. 8A, which illustrates an initial decision tree algorithm 800, consistent with an illustrative embodiment. As shown, initial decision tree algorithm 800 is an example of ML model 450 prior to being pruned by pruning module 440. As shown in FIG. 8B, the code 850 associated with initial decision tree algorithm 800 includes rules interpretable by a machine, and not necessarily a human/individual. In total, code 850 includes 33 state variables.

Figure 9A:
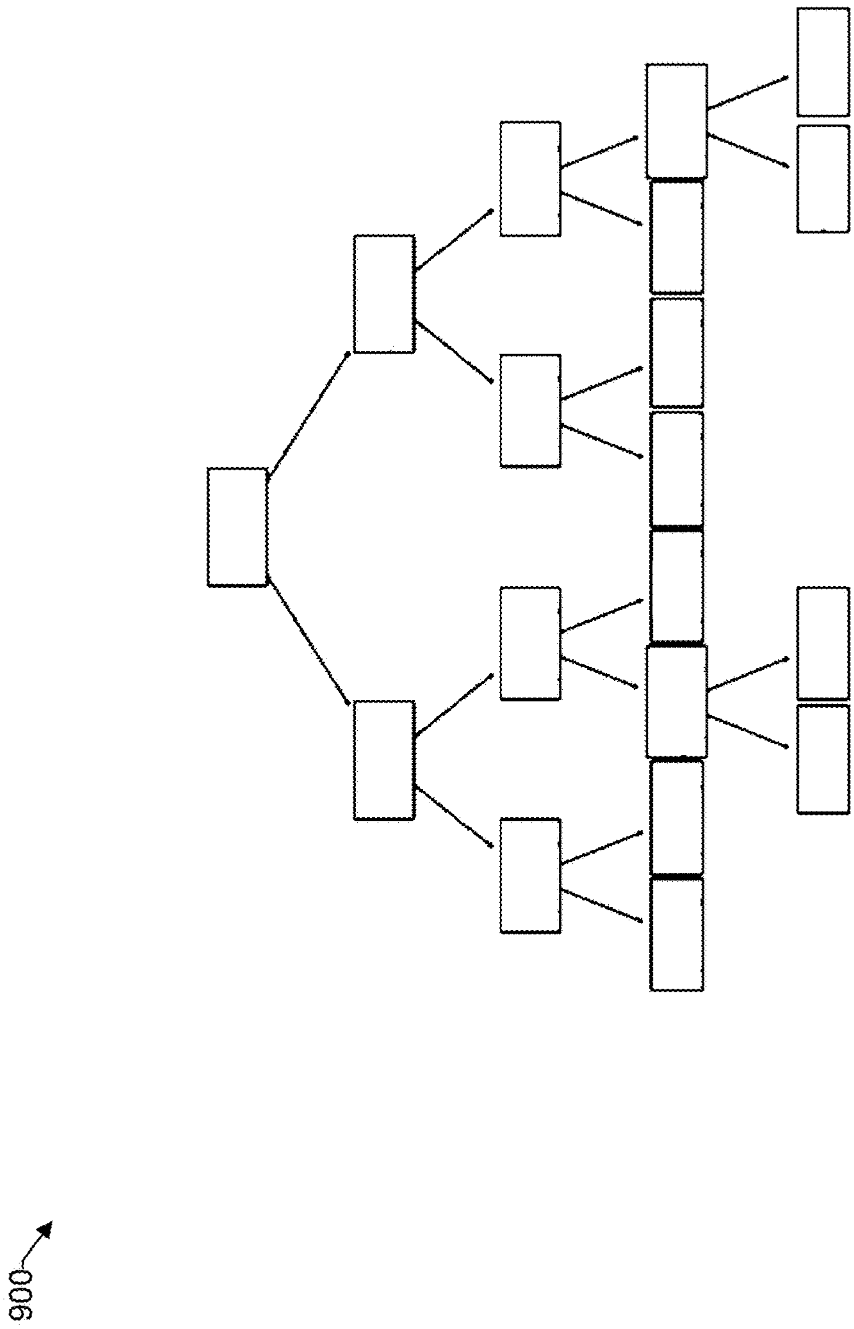
FIG. 9A illustrates a finalized decision tree algorithm, consistent with an illustrative embodiment.

Reference is now made to FIG. 9A, which illustrates a finalized decision tree algorithm 900, consistent with an illustrative embodiment. As shown, finalized decision tree algorithm 900 is an example of optimized policy 560 after being pruned by pruning module 440. As shown in FIG. 9B, the code 950 associated with finalized decision tree algorithm 900 includes rules interpretable by a human/individual. In total, code 950 includes four state variables, which makes code 950 simpler to interpret than code 850.

Figure 10A:
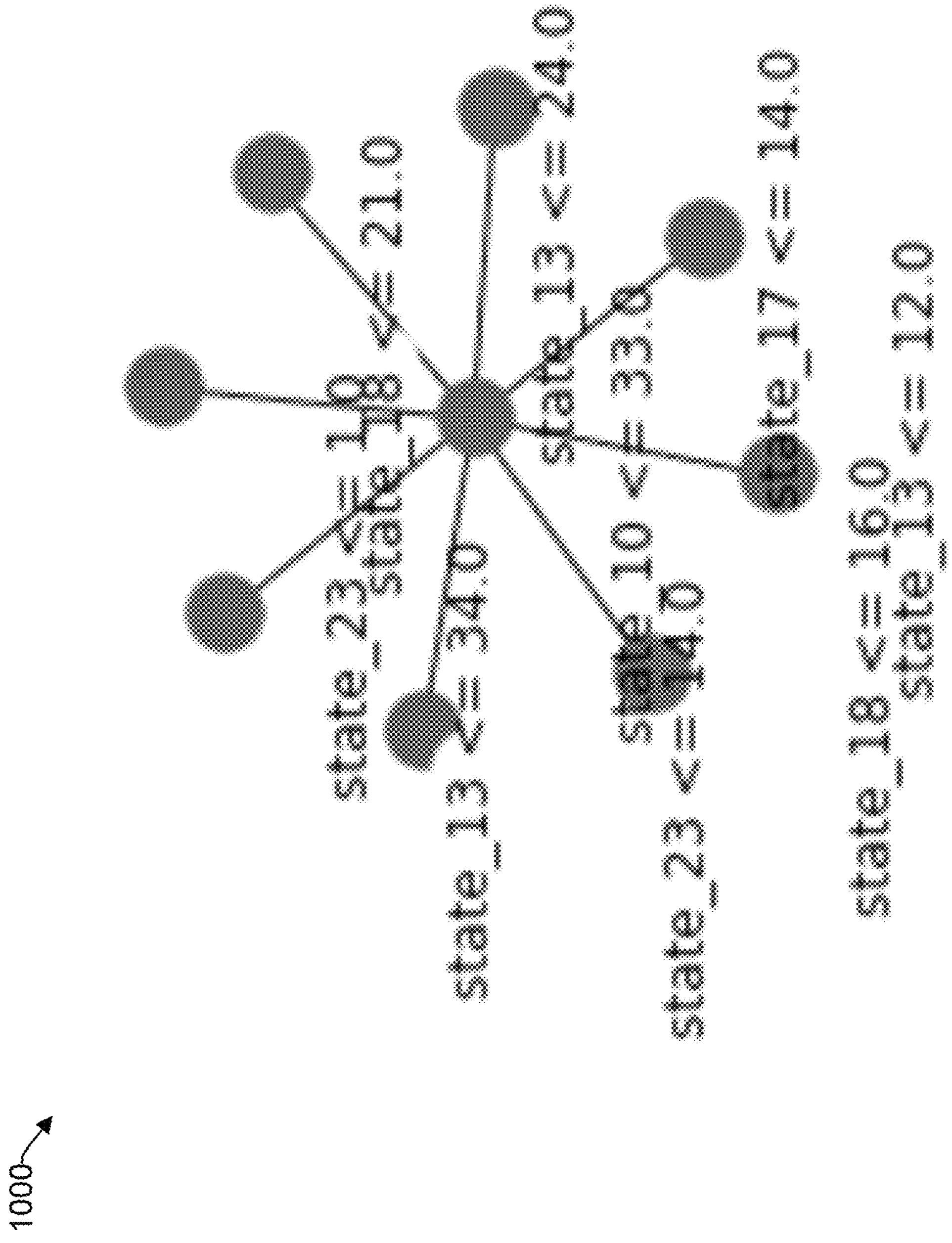
FIG. 10A illustrates an initial graph neural network algorithm, consistent with an illustrative embodiment.
Figure 10B:
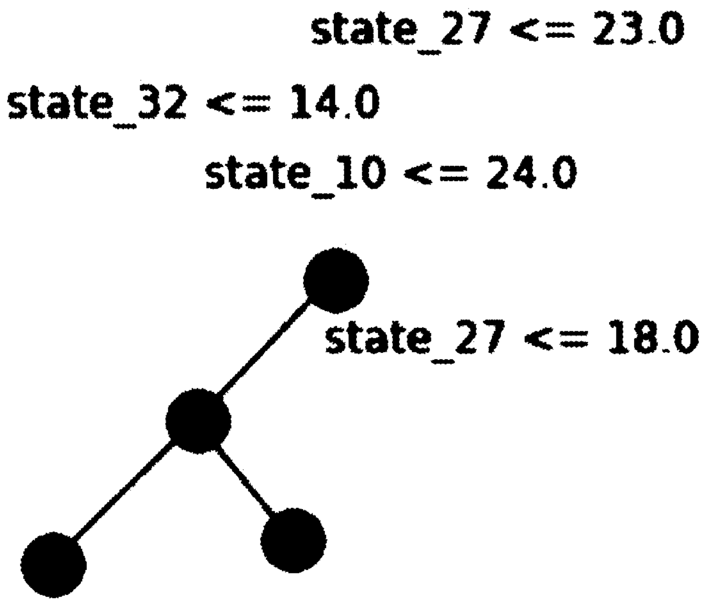
FIG. 10B illustrates a finalized graph neural network algorithm, consistent with an illustrative embodiment.

Reference is now made to FIG. 10A, which illustrates an initial graph neural network algorithm 1000, consistent with an illustrative embodiment. As shown, initial graph neural network algorithm 1000 is an example of ML model 450 prior to being pruned by pruning module 440 and includes five state variables. As shown in FIG. 10B, a finalized graph neural network algorithm 1050 is depicted, consistent with an illustrative embodiment. Algorithm 1050 is an example of optimized policy 560 after being pruned by pruning module 440 and includes three state variables, which makes algorithm 1050 simpler to interpret by a human/individual than algorithm 1000.

Reference is now made to FIG. 10C, which presents computer readable code 1075 configured to call states with the highest rewards, consistent with an illustrative embodiment. As shown, the states with the largest rewards according to the function include: state_18, state_16, state-21, and state_24.

FIG. 11A is a chart 1100 comparing algorithms to the number of rewards, consistent with an illustrative embodiment. As shown in chart 1100, processes carried out include proximal policy optimization (PPO), a Markov Decision Process (MDP) interpreted with a logical neural network algorithm (LNN), a Markov Decision Process (MDP) interpreted with a decision tree algorithm (DT), and a Markov Decision Process (MDP) interpreted with a graphical neural network (GNN) algorithm. PPO, which is carried out first, presented a rewards output of 449. In a subsequent step, carrying out the MDP produced a range of rewards varying in distance from the PPO rewards output of 449. When MDP interpreted with an LNN algorithm is run, the rewards decrease to only 444 rewards, which is still close to the initial amount of 449. When MDP interpreted with a DT algorithm is run, the rewards decrease to 411, which is less than the interpretation with an LNN but still close to the initial rewards amount of 449. And when MDP interpreted with GNN is run, the rewards decrease to 379, which is less than the three previous reward amounts but is still close to the initial rewards amount of 449. This implies that degradation to the results can be minimized in order to produce an accurate set of rules that are also interpretable by not just data scientists and optimization experts, but also business users or customers.

FIG. 11B presents a chart 1150 comparing variables of a PPO algorithm and an MDP algorithm, consistent with an illustrative embodiment. As shown, MDP is carried out using a logical neural network (LNN) algorithm. The PPO policy (prior to being pruned), includes a rewards output of 449 and 33 state variables. PPO policy further includes the first three action states (action_0, action_1, and action_2): [0, 100], [0, 90], and [0, 80]. The MDP policy (after being pruned), includes a rewards output of 444 and 3 state variables. By utilizing the pruning process disclosed, the final pruned policy presents more specific ranges of inventory for each action.

Below, exemplary rules interpretable by a human/individual are presented:

When inventory on all three states is minimal: order at least {25,30,15}.

When states 1 and 2 have minimal inventory and at state 0 there are between 30 to 55 items:

order at least 20 items for state 1 (i.e., action_0>=20).

When state 0 has 6 to 29 items, state 1 has 6 to 50 items, and state 2 has 6 to 20 items:

order at least 10 items from infinite storage (i.e., action_2>=10).

When state 0 has 30 to 55 items, state 1 has 51 to 65 items, and state 2 is greater than 20:

order at least 20 items for state 1 (i.e., action_0>=20).

FIG. 12 presents a chart 1200 comparing a plurality of features of a decision tree algorithm and a graphical neural network algorithm applied to a Markov Decision Process, consistent with an illustrative embodiment. The top four rewards states were compared between decision tree (DT) algorithm and graphical neural network (GNN) algorithm. As shown, the decision tree algorithm has train and test accuracies of 88.16% and 86.09%, which are both greater than the train and test accuracies of graphical neural network (GNN) algorithm (73.33% and 68.00%, respectively). For the DT algorithm, the reward is roughly 411.38 and the training time is roughly 69.46 seconds while the reward for the GNN algorithm is 361 and the training time is multiple hours. For at least the DT algorithms, the training time is remarkably shorter than the training times associated with training neural networks in conjunction with a supply chain environment, which can take hours.

With reference to the disclosed embodiments, the methods, computing devices, and computer program products combine a neuro-symbolic decision-making approach with a sequential decision making approach to achieve increased interpretability for both machine and human/individual.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term “exemplary” is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by “a” or “an” does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for increasing interpretability of decision making methods using a machine learning (ML) module, a reinforcement learning (RL) module, a pruning module, a network module, and an environment, the computer-implemented method comprising:
- providing, by the network module, raw data from the environment to the ML module;
- generating, by the ML module, a trained classifier using the raw data;
- pruning, by the pruning module, a plurality of dominant variables using the trained classifier;
- providing, by the network module, the raw data and the pruned plurality of dominant variables to the RL module, wherein each dominant variable of the pruned plurality of dominant variables is deemed a salient variable for each decision of a plurality of decisions made with respect to the trained classifier;
- generating, by the RL module, a sub-optimal policy based on the raw data and the pruned plurality of dominant variables;
- applying, by the RL module, the generated sub-optimal policy to the environment; and
- generating, by the RL module, a trajectory based on the applying of the generated sub-optimal policy; and
- generating, by the ML module, an interpretable set of rules using the generated trajectory.

2. The computer-implemented method of claim 1, wherein the environment comprises a supply chain environment.

3. The computer-implemented method of claim 1, wherein the ML module comprises computer readable code configured to provide agent instructions to run a reinforcement learning algorithm.

4. The computer-implemented method of claim 3, wherein the ML module is a deep learning (DL) module.

5. The computer-implemented method of claim 1, wherein the RL module is a Markov Decision Process (MDP) module.

6. The computer-implemented method of claim 5, wherein the MDP module is trained with an algorithm in under two minutes.

7. The computer-implemented method of claim 1, wherein the RL module comprises computer readable code configured to provide Markov Decision Process (MDP) solver instructions to run at least one of a decision tree algorithm, a logical neural network algorithm, or a graph neural network algorithm.

8. The computer-implemented method of claim 1, wherein
- the trained classifier includes a plurality of states and a first plurality of interpretable rules for a policy,
- the plurality of dominant variables is pruned from the plurality of states,
- the plurality of dominant variables is less than the plurality of states, and
- rewards associated with the plurality of dominant variables are higher among the plurality of states.

9. A computer program product for increasing interpretability of decision making methods, the computer program product comprising a computer readable storage medium having program instructions embodied therewith, the program instructions executable by a processor to cause the processor to perform:
- providing, by a network module, raw data from an environment to a machine learning (ML) module;
- generating, by the ML module, a trained classifier using the raw data;
- pruning, by a pruning module, a plurality of dominant variables using the trained classifier;
- providing, by the network module, the raw data and the pruned plurality of dominant variables to a reinforcement learning (RL) module, wherein each dominant variable of the pruned plurality of dominant variables is deemed a salient variable for each decision of a plurality of decisions made with respect to the trained classifier;
- generating, by the RL module, a sub-optimal policy based on the raw data and the pruned plurality of dominant variables;
- applying, by the RL module, the generated sub-optimal policy to the environment; and
- generating, by the RL module, a trajectory based on the applying of the generated sub-optimal policy; and
- generating, by the ML module, an interpretable set of rules using the generated trajectory.

10. The computer program product of claim 9, wherein the environment comprises a supply chain environment.

11. The computer program product of claim 9, wherein the program instructions further cause the processor to authorize an agent to run a reinforcement learning algorithm.

12. The computer program product of claim 11, wherein the ML module is a deep learning (DL) module.

13. The computer program product of claim 9, wherein the RL module is a Markov Decision Process (MDP) module.

14. The computer program product of claim 9, wherein the program instructions further cause the processor to authorize a Markov Decision Process (MDP) solver to run at least one of a decision tree algorithm, a logical neural network algorithm, or a graph neural network algorithm.

15. A computing device comprising:
- a processor;
- a network module coupled to the processor to enable communication over a network;
- a storage device coupled to the processor;
- a machine learning (ML) module coupled to the network module;
- a reinforcement learning (RL) module coupled to the network module;
- a pruning module coupled to the network module; and
- program instructions stored on the storage device for execution by the processor via a memory, wherein execution of the program instructions by the processor configures the computing device to perform a method comprising:
  - providing, by the network module, raw data from an environment to the ML module;
  - generating, by the ML module, a trained classifier using the raw data;
  - pruning, by the pruning module, a plurality of variables using the trained classifier;

providing, by the network module, the raw data and the pruned plurality of dominant variables to the RL module, wherein each dominant variable of the pruned plurality of dominant variables is deemed a salient variable for each decision of a plurality of decisions made with respect to the trained classifier;

generating, by the RL module, a sub-optimal policy based on the raw data and the pruned plurality of dominant variables;

applying, by the RL module, the generated sub-optimal policy to the environment; and generating, by the RL module, a trajectory based on the applying of the generated sub-optimal policy; and generating, by the ML module, an interpretable set of rules using the generated trajectory.

16. The computing device of claim 15, wherein the environment comprises a supply chain environment.

17. The computing device of claim 15, wherein the ML module comprises computer readable code configured to provide agent instructions to run a reinforcement learning algorithm.

18. The computing device of claim 17, wherein the ML module is a deep learning (DL) module.

19. The computing device of claim 15, wherein the RL module is a Markov Decision Process (MDP) module.

20. The computing device of claim 19, wherein the MDP module is configured to be trained with an algorithm in under two minutes.

21. The computing device of claim 15, wherein the RL module comprises computer readable code configured to provide Markov Decision Process (MDP) solver instructions to run at least one of a decision tree algorithm, a logical neural network algorithm, or a graph neural network algorithm.

* * * * *